(12) United States Patent
Varma et al.

(10) Patent No.: US 8,932,508 B2
(45) Date of Patent: Jan. 13, 2015

(54) FIRE RESISTANT GLAZING

(75) Inventors: Karikath Su Varma, Southport (GB); David Holden, Wigan (GB); John Richard Holland, Ormskirk (GB)

(73) Assignee: Pilkington Group Limited, St. Helens (GB)

( * ) Notice: Subject to any disclaimer, the term of this patent is extended or adjusted under 35 U.S.C. 154(b) by 1236 days.

(21) Appl. No.: 12/312,013

(22) PCT Filed: Oct. 30, 2007

(86) PCT No.: PCT/GB2007/050664
§ 371 (c)(1),
(2), (4) Date: Jan. 19, 2010

(87) PCT Pub. No.: WO2008/053248
PCT Pub. Date: May 8, 2008

(65) Prior Publication Data
US 2010/0129669 A1 May 27, 2010

(30) Foreign Application Priority Data

Oct. 31, 2006 (GB) .................................. 0621573.5

(51) Int. Cl.
*C04B 12/04* (2006.01)
*B32B 17/10* (2006.01)
*C09K 21/02* (2006.01)

(52) U.S. Cl.
CPC ........... *B32B 17/10311* (2013.01); *C09K 21/02* (2013.01)
USPC ............................. 264/333; 428/426; 428/428

(58) Field of Classification Search
CPC ........................ B32B 17/069; B32B 17/10311
USPC ..................................... 428/426, 428; 264/333
See application file for complete search history.

(56) References Cited

U.S. PATENT DOCUMENTS

| | | | |
|---|---|---|---|
| 5,437,902 A | 8/1995 | Itoh et al. | |
| 5,565,273 A | 10/1996 | Egli et al. | |
| 5,653,839 A * | 8/1997 | Itoh et al. | ...................... 156/109 |
| 6,479,156 B1 | 11/2002 | Schmidt et al. | |
| 6,929,691 B1 | 8/2005 | Holland et al. | |
| 7,189,285 B2 | 3/2007 | Holland et al. | |
| 7,282,092 B2 | 10/2007 | Holland et al. | |
| 2005/0255323 A1 | 11/2005 | Varma et al. | |
| 2006/0257668 A1* | 11/2006 | Frommelt et al. | ............ 428/428 |
| 2007/0026242 A1 | 2/2007 | Holland et al. | |

FOREIGN PATENT DOCUMENTS

| | | |
|---|---|---|
| EP | 0 590 978 B1 | 2/1998 |
| EP | 0 620 781 B1 | 5/1999 |
| EP | 0 981 580 B1 | 7/2002 |
| WO | WO 01/10638 A1 | 2/2001 |
| WO | WO 2004/014813 A2 | 2/2004 |

* cited by examiner

*Primary Examiner* — Galen Hauth
(74) *Attorney, Agent, or Firm* — Marshall & Melhorn, LLC

(57) ABSTRACT

The incorporation of polyvalent metal ions into a silicate based interlayer in a laminated fire resistant glazing produced using a cast in place process provides an improvement in the properties of those glazings. The preferred metal ions are aluminium ions and zirconium ions. The preferred polyvalent metal compounds are those which are disclosed in EP 1206349 and WO 2004/014813.

13 Claims, No Drawings

FIRE RESISTANT GLAZING

BACKGROUND OF THE INVENTION.

This invention relates to fire resistant glazings and to methods for the production of fire resistant glazings.

Fire resistant glazings generally comprise laminated structures having at least two transparent panes and at least one fire resistant interlayer. The transparent panes are normally glass panes although other transparent materials such as polycarbonates may be used. The interlayer must be optically clear and must remain clear without discolouration throughout the lifetime of the glazing. It must also function so as to improve the fire resistance of the glazing.

In many countries regulations exist specifying the fire resistance to be exhibited by a glazing intended for use in a particular location. Generally these regulations specify either a minimum time for which the glazing must form a barrier to the propagation of a flame when one side of the glazing is exposed to a fire and/or a minimum time for which the temperature and/or the intensity of radiated heat on the side of the glazing which is not exposed to the fire must remain below a specified figure. Glass panes will not meet any or all of these requirements and the fire resistant glazings which have been developed are laminated glazings having at least one interlayer between at least two opposed glass panes.

One type of interlayer which has been developed is based upon an alkali metal silicate waterglass. These silicate interlayers intumesce upon exposure to heat to form an opaque foam. The foam serves to assist the retention of the glass panes and acts as a barrier to radiant heat.

One method for forming a silicate based interlayer is to pour a waterglass solution on to the surface of a glass pane and dry the solution under controlled conditions to form a thin layer on the glass. A second pane may be placed on top of the dried interlayer to form a fire resistant glazing. Such processes are in use in the production of fire resistant glazings such as those sold by the Pilkington Group of companies under its trade marks PYROSTOP and PYRODUR.

A second method of forming a fire resistant glazing comprising a silicate based interlayer is the so called cast in place method in which a silicate solution is introduced into the space between two opposed panes and cured to form an interlayer. In a cast in place process the water content of the solution is retained in the cured interlayer. This high water content can absorb significant quantities of heat during a fire but can lead to failure caused by the generation of steam. A difficulty inherent in cast in place processes is the balance between the need for the solution to have a low enough viscosity to be poured into the space between two opposed glass panes and the need to cure that solution to form an interlayer which is sufficiently rigid to be retained in position through the lifetime of the glazing.

EP 590978 describes a cast in place process for the production of a fire resistant glass wherein the interlayer comprises an aqueous gel comprising an acrylamide polymer and a particulate metal oxide is produced by introducing a dispersion comprising an acrylamide monomer, the particulate metal oxide and a photopolymerisation initiator between the glass panes and irradiating the dispersion thereby polymerising the monomers. The fire resistance of the glazings produced is insufficient to meet the requirements of many of the regulations governing the use of fire resistant glazings.

EP 620781 discloses a method for producing a fire resistant glazing comprising a silicate based interlayer using a cast in place process and glazings produced by that process. The interlayer is produced by pouring a solution which comprises an alkali metal silicate wherein the molar ratio of silicon dioxide to alkali metal oxide is greater than 4:1 and from at least about 44% to 60% by weight of water between two glass panes. The solution comprises silica acid as curing agent. After pouring the composition is allowed to stand until it self cures to form a polysilicate. It is suggested that a wide variety of organic and inorganic compounds could be used as curing agents or as supplementary curing agents in small quantities provided that they do not form an insoluble precipitate when mixed with the silicate. There is no specific disclosure of any curing agent other than silicic acid.

EP 981580 discloses a method for producing a fire resistant glazing comprising a silica based interlayer using a cast in place process and glazings produced by that process in which the interlayer is obtained by pouring a solution which comprises at least 35% by weight of nanoparticulate silica, from 10 to 60% by weight of a polyfunctional compound such as a polyol and from 1 to 40% by weight of a solvent which is preferably water between two glass panes. The polyfunctional compound is said to give rise to a degree of cross linking of the silica particles. The preferred polyfunctional compounds are polyols.

DETAILED DESCRIPTION OF THE INVENTION.

We have now discovered that the fire resistance of a glazing comprising a silicate based interlayer which may be produced by a cast in place process is increased by the introduction of a polyvalent metal compound into a silicate based solution. The polyvalent metal compounds act as co-curing agents for the solution and are effective in improving the fire resistance of the glazing. When subject to a fire the interlayers of this invention intumesce to form a foam having a more even structure and increased refractoriness than is produced in the absence of the polyvalent metal compound. This even foam structure results in a laminated glazing which exhibits a more consistent degree of fire resistance. From a first aspect this invention provides a method for the production of a fire resistant laminated glazing comprising a silicate based interlayer which comprises pouring a solution of an alkali metal silicate into a cavity formed between two opposed transparent panes and allowing the solution to cure without drying which is characterised in that the aforesaid solution further comprises a polyvalent metal compound.

The preferred metal compounds for use in the present invention are compounds of zirconium and aluminium. In those embodiments where the metal compound is a compound of zirconium the preferred compounds are those having the formula $[M]_n^+[Zr(A)_x(OH)_y]_n^-$ wherein M represents a water soluble cation; A represents a ligand which has anionic character in aqueous silicate solutions; x has an average value of from 1 to 6, y has an average value of from 2 to 6 and n has an average value of from 1 to 10. The preferred compounds are those wherein A represents a carbonate ion or an anion of an alpha hydroxy carboxylic acid especially citric acid. The most preferred compound of zirconium for use according to the present invention is potassium zirconium carbonate.

In those embodiments of the present invention where the metal compound is a compound of aluminium the preferred compounds are those which may be obtained in solution by the partial neutralisation of a water soluble aluminate with a hydroxy carboxylic acid. The preferred aluminates are sodium aluminate and potassium aluminate. The preferred carboxylic acids are tartaric acid and citric acid. The solutions preferably have a pH in the range 9.0 to 11.0 and a solids content of from 20 to 45% by weight.

Silicate solutions comprising these compounds of zirconium are described in our European patent 1206349. Solutions obtained by the partial neutralisation of a water soluble aluminate with a hydroxy carboxylic acid are described in our International application WO 2004/014813. These solutions are used in the production of fire resistant glazings in which a silicate solution is poured on to a glass surface and dried to fire a fire resistant interlayer. The water content of these dried interlayers is less than 30%. Laminated glazings comprising at least two transparent panes and at least one interlayer wherein the interlayer is a silicate based interlayer comprising more than 30% by weight of water and a polyvalent metal compound are believed to be novel. Thus from a second aspect this invention provides a fire resistant laminated glazing comprising at least one interlayer and at least two transparent panes characterised in that the interlayer comprises a water soluble silicate, a polyvalent metal compound and at least 30% by weight of water.

These metal compounds act as a curing agent in any silicate based formulation which is useful in the production of fire resistant glazings using a cast in place process. Such formulations may comprise an alkali metal silicate wherein the molar ratio of silicon dioxide to alkali metal oxide is greater than 3:1 and preferably greater than 3.5:1. Most preferably the silicate will comprise a molar ratio of silicon dioxide to alkali metal oxide which is greater than 4:1. The preferred alkali metal silicate is potassium silicate. Sodium silicate and mixtures of sodium and potassium silicate are also useful in the present invention. These alkali metal silicate solutions may be formed by the addition of silica to a solution of an alkali metal silicate or by the addition of a caustic alkali to a dispersion of silica particles. In particular the alkali metal silicate solutions may be formed by the addition of an aqueous dispersion of silica and alkali metal silicate solution as is described for example in EP 620781 or by homogenising a dispersion of nanoparticulate silica in an aqueous medium comprising a polyol and potassium hydroxide as is described in U.S. Pat. No. 6,479,156. Also the silicate solutions may be produced by combining an organic silica sol with an alkali metal silicate solution as described in our copending application entitled "Method for the production of Fire Resistant Glazings" of even date herewith. In this copending application the silicate solution is formed by mixing a silicate solution with a silica sol. These silica sols comprise a dispersion of silica particles in an aqueous or an organic medium which comprises at 30%, more preferably at least 40% and most preferably at least 50% by weight of silica.

The organic medium may be any non aqueous solvent in which the desired quantity of silica may be dispersed. It will preferably be a solvent which can be incorporated into an optically clear stable interlayer. Examples of useful solvents include glycerol, ethylene glycol, propylene glycol, polyethylene glycol and trimethylol propane.

The silica particles will preferably have an average particle size in the range of from 7 nm to 50 nm. These particles are more readily dispersed in the sol and do not scatter light when incorporated in an interlayer. The organic silica sol preferably comprises an organically modified silica. Such dispersions are available as articles of commerce. They are characterised by their exhibiting a lower than expected Si—OH absorption peak in the dried form. They may be produced by forming the silica particles in an aqueous system, removing a portion of the water present and replacing it with organic material. These organically modified silicas have a more uniform particle size then those produced by dispersing silica particles in an organic medium.

The relative proportion of aqueous and organic silica sols can be adjusted so as to produce an interlayer with a desired water content.

The amount of polyvalent metal compound which is introduced should be at least 0.1% by weight of the formulation (expressed as weight of metal oxide [$ZrO_2$ or $Al_2O_3$]). Preferably the formulations will comprise from 0.2% to 1.0% of polyvalent metal compound. The introduction of excessive quantities of polyvalent metal compound may result in the formation of a brittle interlayer and a consequent reduction in the fire resistance of the laminated glazing. The optimum amount of polyvalent metal compound may be determined by routine experiment.

These formulations may comprise from 30 to 60% by weight of water, preferably from 35 to 60% by weight of water in total. Preferably they comprise less then 50% and more preferably less than 45% by weight of water. Lower water contents lead to the production of laminated glazings which exhibit improved fire resistance and are thereby preferred. However as the water content decreases the viscosity of the formulation increases to a point when the formulation is no longer pourable. The water content of the preferred formulations represents a compromise between the need for the solution to be pourable and the desire that the glazing exhibits the optimum fire resistance.

The water content of the formulations is derived solely from the water content of the components of those formulations. The water content of the formulation can be decreased by reducing the water content of these components or by replacing some or all of the water content of these components with an organic solvent medium.

The formulations may also comprise an organic compound comprising at least one and preferably more than one hydroxyl group as part of its molecular structure. Preferably these alcohols and polyols are compounds which are liquid at room temperature and are water miscible. Examples of organic compounds which are preferred for use in the formulations of the present invention include glycerol, ethylene glycol, propylene glycol, polyethylene glycol, trimethylol propane, pentaerythritol, sorbitol, mannitol, sucrose and xylitol.

Compounds such as ethylene glycol and glycerol act as plasticizers for the interlayer and may usefully be incorporated into interlayers which might otherwise be too brittle to exhibit the desired degree of fire resistance. Preferably the interlayer comprises up to 15% by weight and more preferably from 2 to 10% by weight of glycerol or ethylene glycol. Saccharides such as sorbitol, xylitol or mannitol act to bind water in the interlayer and to improve the fire resistance of the glazing. The preferred interlayers comprise from 5 to 10% by weight of the saccharide.

The total quantity of organic compound in the interlayer is preferably less than 15% by weight, more preferably within the range 2 to 15% by weight and most preferably within the range 2 to 10% by weight. The incorporation of the organic material, particularly higher quantities of the organic material can lead to problems of incompatibility which may be manifest in the formation of cloudy or white formulations. These problems may be overcome by routine experiment or possibly by heating the formulation.

The formulation is poured into the cavity formed between two opposed panes which are normally glass panes. The glass panes are preferably float glass panes having a thickness of from 2.0 to 8.0 mm. The panes may have a heat reflective coating upon at least one surface. Glass panes having such a coating are well known in the art and are available as articles of commerce. One example of a coated glass which may be used is the low emissivity glass sold by the Pilkington Group under its trade mark K Glass. Preferably the float glass panes are toughened glass panes. The panes may also be formed from borosilicate glasses or from ceramic glasses such as those sold by the Nippon Electric Glass Company under the Trade Mark FIRELITE.

The narrow sides of the cavity are closed using a suitable sealant which extends around the perimeter of the panes. The width of the space between the panes is preferably in the range 2 mm to 8 mm, preferably in the range 3 mm to 6 mm. The formulation is subject to a degassing step and then poured into the cavity through an opening in the sealant. When the cavity is full the opening is closed and the glazing allowed to stand for a sufficient time to cure the formulation. The curing may be accelerated by heating the glazing to an elevated temperature say 50 to 90° C.

The invention is illustrated by the following examples.

The formulations having the compositions presented as Table 1 were made up by premixing the polyvalent metal additive and ethylene glycol and separately the silica dispersion and the saccharide. These premixed dispersions were added at a steady rate to the potassium silicate solution with stirring at room temperature. The mixed solution was degassed under reduced pressure and cast into cells made of 5 mm toughened glass with a 3 mm cavity. The solution is cured at elevated temperature to form a solid interlayer. The cured glasses were tested according to the standard EN1363/1364.

These potassium silicate solutions were made up by adding an aqueous silica sol comprising 50% by weight of silica having an average particle size of 50 nm to a potassium silicate solution in which the molar ratio of $SiO_2$:$K_2O$ was 1.43. The potassium zirconium carbonate was added as a solution comprising 50% by weight of water.

The invention claimed is:

1. A method for the production of a fire resistant laminated glazing comprising a silicate based interlayer which comprises pouring a solution of an alkali metal silicate into a cavity formed between two opposed transparent panes and allowing the solution to cure without drying, wherein the aforesaid solution further comprises a polyvalent metal compound and wherein the interlayer comprises between 35 and 60% by weight of water.

2. The method according to claim 1, wherein the polyvalent metal compound is a zirconium compound.

3. The method according to claim 2, wherein the zirconium compound is a compound having the general formula $[M]_n^+$ $[Zr(A)_x(OH)_y]^-_n$ wherein M represents a water soluble cation; A represents a ligand which has anionic character in aqueous silicate solutions; x has an average value of from 1 to 6, y has an average value of from 2 to 6 and n has an average value of from 1 to 10.

4. The method according to claim 3, wherein the zirconium compound is a compound in which A represents a carbonate ion.

5. The method according to claim 4, wherein the zirconium compound is potassium zirconium carbonate.

6. The method according to claim 3, wherein the zirconium compound is a compound in which A represents an anion of an alpha hydroxy carboxylic acid.

7. The method according to claim 6, wherein A represents a citrate ion.

8. The method according to claim 1, wherein the polyvalent metal compound is an aluminium compound.

9. The method according to claim 8, wherein the aluminium compound has been produced by the partial neutralisation of a water soluble aluminate with a hydroxy carboxylic acid.

10. The method according to claim 9, wherein the aluminate is sodium aluminate or potassium aluminate.

11. The method according to claim 9, wherein the carboxylic acid is tartaric acid or citric acid.

12. The method according to claim 1, wherein the molar ratio of $SiO_2$:$M_2O$, where M represents an alkali metal in the alkali metal silicate solution, is at least 3:1.

13. The method according to claim 12, wherein the molar ratio of $SiO_2$:$M_2O$ is at least 4:1.

| Example No | Molar Ratio $SiO_2$:$K_2O$ | Water Content % | Water Content Potassium Silicate % | Ethylene Glycol % | Potassium Zirconium Carbonate Solution % | Sorbitol % | Max Size/m | Fire test |
|---|---|---|---|---|---|---|---|---|
| 1 | 4.7 | 43.9 | 47.6 | 5 |  | 5 | 1.2 × 2.3 | Fails EW60 |
| 2 | 4.7 | 43.9 | 47.6 | 5 | 1.6 | 5 | 1.2 × 2.3 | Passes EW60 |
| 3 | 4.7 | 40.0 | 40.4 | 5 | 1.6 | 5 | 1.2 × 2.3 | Passes EW60 |